(12) United States Patent
Kulkarni et al.

(10) Patent No.: US 7,624,371 B2
(45) Date of Patent: Nov. 24, 2009

(54) EXTENSIBLE AUTOMATION DEVELOPMENT ENVIRONMENT

(75) Inventors: Sandeep Shashikant Kulkarni, Aliso Viejo, CA (US); Guruprasad Ranganarasimhan, Lake Forest, CA (US)

(73) Assignee: Invensys Systems, Inc., Foxboro, MA (US)

( * ) Notice: Subject to any disclaimer, the term of this patent is extended or adjusted under 35 U.S.C. 154(b) by 21 days.

(21) Appl. No.: 11/650,024

(22) Filed: Jan. 5, 2007

(65) Prior Publication Data

US 2008/0092116 A1    Apr. 17, 2008

Related U.S. Application Data

(60) Provisional application No. 60/829,619, filed on Oct. 16, 2006.

(51) Int. Cl.
*G06F 9/44* (2006.01)
*G05B 19/18* (2006.01)

(52) U.S. Cl. .................. 717/110; 717/100; 717/103; 717/104; 717/106; 700/65; 700/83; 700/95; 700/96

(58) Field of Classification Search .......... 717/110, 717/138, 178, 100, 103, 104, 106, 136; 700/83, 700/65, 11, 95, 96
See application file for complete search history.

(56) References Cited

U.S. PATENT DOCUMENTS

| | | | | |
|---|---|---|---|---|
| 5,528,503 A | * | 6/1996 | Moore et al. | 700/95 |
| 5,754,858 A | * | 5/1998 | Broman et al. | 717/111 |
| 6,141,595 A | * | 10/2000 | Gloudeman et al. | 700/83 |
| 7,302,675 B2 | * | 11/2007 | Rogers et al. | 717/125 |
| 7,360,202 B1 | * | 4/2008 | Seshadri et al. | 717/106 |
| 2002/0083414 A1 | * | 6/2002 | Cheng et al. | 717/110 |
| 2006/0052884 A1 | * | 3/2006 | Staples et al. | 700/83 |
| 2006/0158438 A1 | * | 7/2006 | Hunter | 345/173 |
| 2007/0028208 A1 | * | 2/2007 | Maki | 717/106 |

OTHER PUBLICATIONS

Automating software specification, design and synthesis for computer aided control system design tools,Ranville, S.; Bostic, D.; Toeppe, S., vol. 1 2000, pp. 4C3/1-4C312.*

(Continued)

*Primary Examiner*—Wei Y Zhen
*Assistant Examiner*—Satish Rampuria
(74) *Attorney, Agent, or Firm*—Leydig, Voit & Mayer Ltd.

(57) ABSTRACT

The present invention provides an extensible automation development environment. A full development environment in its own right, the environment, in addition to supporting its own native objects, allows the integration of foreign (or "custom") automation objects. Custom commands and custom events are also integrated into the environment and are handled by the same framework that handles native commands and events. Tools provided by the environment are made to work with custom objects as well as with native objects. For example, a common editor expands to incorporate a custom editor that handles custom data fields. A common browser expands to seamlessly incorporate a custom browser that may operate on custom automation objects from a custom database. All software entities, native and custom, can be developed and monitored within a single framework. Users operate seamlessly across heterogeneous automation environments, even though custom entities in the environment conform to their own operating standards.

14 Claims, 6 Drawing Sheets

OTHER PUBLICATIONS

Distributed control application platform-a control platform for advanced manufacturing systems, Qu, R.T.; Lim, R.; Ding, Z.Q.; He, H.; Aendenroomer, A.; Goh, K.M., vol. 2 Jul. 20-24, 2003, IEEE, pp. 1166-1171.*

Computer-automated multiparadigm modeling in control systems technology, Mosterman, P.J.; Sztipanovits, J.; Engell, S., vol. 12 Issue: 2 Mar. 2004, IEEE, pp. 223-234.*

Computerized data acquisition for power system automation, Swarup, K.S.; Uma Mahesh, P., Apr. 10-12, 2006, IEEE, pp. 1-7.*

A human machine interface for distributed virtual laboratories, Gertz, M.W. Stewart, D.B. Khosla, P.K. , IEEE, Dec. 1994, vol. 1, Issue: 4, pp. 5-13.*

International Search Report and Written Opinion for PCT/US07/81503 dated Jul. 29, 2008.

* cited by examiner

FIG. 1

Extensible Development Environment 100

Views and Dialogs 102
- Model 108
- Deployment 110
- Derivation 112
- Custom View 114
- Template Toolbox 116
- Browser 118
- Object Editor 120
- Custom Object Editor 122

Object Commands and Events 104
- Import 124
- Export 126
- Assign 128
- UnAssign 130
- Open 132
- Custom 134
- Deploy 136
- Validate 138
- UnDeploy 140
- Check In 142
- Check Out 144

Global Commands and Events 106
- Default 146
- Custom 148

EXTENSIBLE AUTOMATION DEVELOPMENT ENVIRONMENT

CROSS-REFERENCE TO RELATED APPLICATION

This application claims priority to U.S. Provisional Patent Application 60/829,619, "Extensible Automation Development Environment," which was filed on Oct. 16, 2006, and which is incorporated herein by reference in its entirety.

FIELD OF THE INVENTION

The present invention relates generally to computer software for automation control, and, more particularly, to an extensible environment for developing automation control objects.

BACKGROUND OF THE INVENTION

Industry increasingly depends upon highly automated data-acquisition and control systems to ensure that industrial processes run efficiently and reliably while lowering overall production costs. Data acquisition begins when sensors measure aspects of an industrial process and report their measurements back to a data-collection and control system. Such measurements could include, for example, temperature, pressure, pH, mass or volume flow of a material, count of items passing through a particular machine or process, and tallied inventory of packages waiting in a shipping line. Sophisticated process-management software examines the incoming measurements, produces status reports and operation summaries, and, in many cases, responds to events and operator instructions by sending commands to controllers that modify operation of at least a portion of the industrial process. These systems of sensors, controllers, and process-management software together allow operators to perform a number of supervisory tasks including tailoring the process in response to varying external conditions, detecting an inefficient or non-optimal operating condition or impending equipment failure, and taking remedial action such as moving equipment into and out of service.

To allow human operators to keep up with a sophisticated industrial process, human-machine interface ("HMI") systems are linked to the data sources, digest their data measurements, and in turn drive visualization applications that render graphical views of the industrial process for the operators. A typical HMI includes a set of graphical views of the industrial process and of its physical output. Each view, in turn, includes one or more graphical elements. Some graphical elements are "animated" in that their display state changes in response to changes in the incoming data measurements. For example, an HMI for a refining process could include a visual depiction of a storage tank. The tank's depiction includes an indicator showing the level of liquid contained in the tank, and the visual indicator rises and falls in response to measurements from a sensor that measures the level of liquid in the actual tank. This type of animation has been found to be considerably easier for a human observer to comprehend than a simple stream of measurements. Graphical images provided by HMI applications are also used to depict, and to facilitate modifying, current process set points.

Typically, the physical sensors and controllers of the industrial process are linked to the HMI by a set of software modeling elements called automation objects. Several vendors offer software for automation control, from automation objects tailored to specific physical sensors and controllers (often manufactured by the same vendor that offers the automation objects), to development environments and databases for managing the automation objects, to full HMI-based supervisory and control systems. Typically, each vendor publishes a set of standards with which developers must comply in order to work with that vendor's offerings. These standards can define, for example, object templates, object interfaces, data, methods, scripts, and commands for developing objects, for deploying the objects into a coherent system, and for operating an enterprise-wide industrial process.

BRIEF SUMMARY OF THE INVENTION

In view of the foregoing, the present invention provides an extensible automation development environment. A full development environment in its own right, the environment, in addition to supporting its own native objects, allows the integration of foreign (or "custom") automation objects. Custom commands and custom events are also integrated into the environment and are handled by the same framework that handles native commands and events. Tools provided by the environment are made to work with custom objects as well as with native objects. For example, a common editor expands to incorporate a custom editor that handles custom data fields. A common browser expands to seamlessly incorporate a custom browser that may operate on custom automation objects from a custom database. All software entities, native and custom, can be developed and monitored within a single framework.

The extensible development environment supports automation applications developed for other systems as well as those developed specifically for this environment. Objects developed for other environments can be re-used in this environment rather than re-developed. The environment supports custom objects throughout their life cycle (development, maintenance, deployment, and operation).

Developers increase their proficiency in the extensible environment by not having to learn the idiosyncrasies of other, proprietary, development environments. Users operate seamlessly across heterogeneous automation environments, even though custom entities in the environment conform to their own operating standards. Third-party developers can use the extensible environment for their own applications, thus leveraging the value provided by the environment.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 1 is a schematic diagram of an extensible automation development environment according to the present invention;

DETAILED DESCRIPTION OF THE INVENTION

Figure 2:
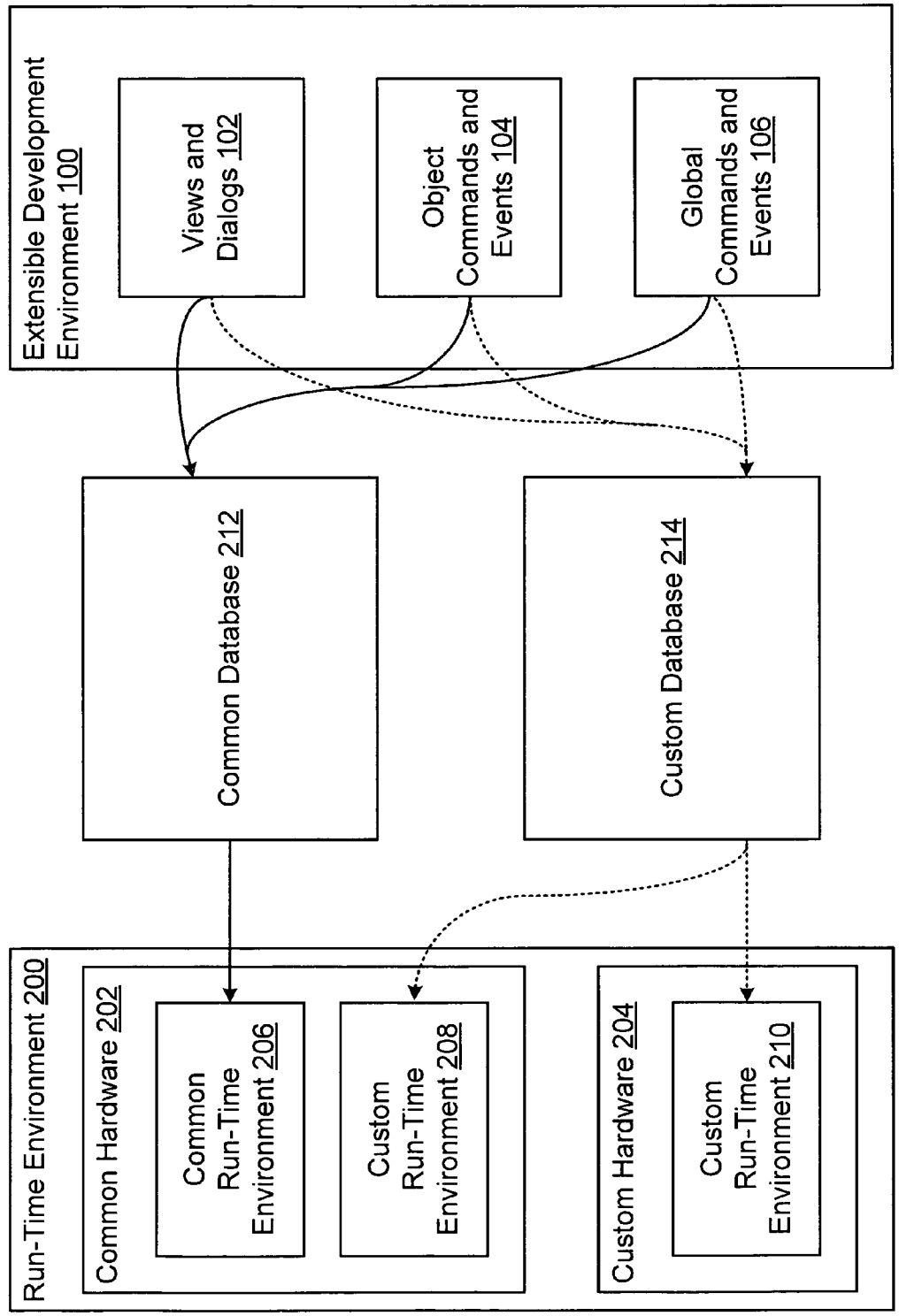
FIG. 2 is a schematic diagram of an automation run-time environment that works with an extensible automation development environment.

Turning to the drawings, wherein like reference numerals refer to like elements, the present invention is illustrated as being implemented in a suitable environment. The following description is based on embodiments of the invention and should not be taken as limiting the invention with regard to alternative embodiments that are not explicitly described herein.

Today, when a vendor develops a software automation object to model an element of an industrial control environment, that object is developed to comply with the published set of standards of a particular development environment. Using the object requires complying with those same standards. These standards are often vendor-proprietary and typically tie the object to the vendor's particular automation development and run-time environments.

The present invention adds extensibility to an automation development environment so that objects need not be tied to the one environment for which they were developed. A third-party developer creates objects and tools according to extensibility standards provided by the new extensible development environment. Then, users see a unified object model that includes both objects native to the extensible development environment and any third-party objects developed for it. (Note, in this document, "common" is used to describe things native to the extensible environment, and "custom" describes things added to the environment by means of the environment's extensibility features.) The unified object model supports development, maintenance, deployment, and ultimately operation of an automation system that runs across standard and proprietary hardware and software platforms.

The concepts of the present invention are general enough to be added to any of several well known non-extensible automation development environments. Preferably, a completely new automation development environment is created with extensibility as one of its core features.

FIG. 1 is a generalized overview of the elements of one embodiment of an extensible automation development environment 100. The extensible development environment 100 can be conceptualized as consisting of three major parts: views and dialogs 102, object commands and events 104, and global commands and events 106. The conceptualization shown in FIG. 1 is only one of many possible and is not intended to limit the scope of the claimed invention in any way.

The extensible environment 100 of FIG. 1 shares many features with the current batch of non-extensible development environments. As is common today, structured objects within the extensible development environment 100 can be represented as templates. From the templates, users derive object instances that interact with one another at run-time to represent elements of an operating automation environment.

In the views and dialogs 102 section of FIG. 1, objects are organized using functional views representing different organizational perspectives: These include the model 108, deployment 110, and derivation 112 views. The custom view 114 and the custom object editor 122 are new to the present invention. A third-party can develop a custom view 114 to present object organization in a new light. The browser 118 can be extended to handle custom objects as discussed below in reference to FIGS. 5 and 6. These custom tools are added to the extensible development environment 100 using methods and interfaces defined in the extensible development environment 100 for that purpose.

Because of the extensible tools described above, the extensible development environment 100 supports custom objects and custom data. Objects, whether common or custom, running in the extensible development environment 100 are expected to intelligently respond to a defined set of common commands and common events provided by the extensible development environment 100 for use in conceiving, managing, upgrading, deploying, and operating the objects. Box 104 of FIG. 1 lists an exemplary set of such common commands and events. Box 104 also includes custom 134 commands and events. These are added to the extensible development environment 100 for use by custom objects. The set of global command and events 106 is also enriched by adding custom 148 commands and events. Users can also use the interfaces provided by the extensible development environment 100 to override existing commands.

These extensibility features allow third parties to quickly add their products to the extensible development environment 100. This enhances the value of the environment 100 itself as a development platform because developers need not learn the intricacies of multiple environments. They can work with objects, including proprietary objects, provided by many different parties all through one unified environment 100.

The benefits of the extensible development environment 100 can be further appreciated by considering the development environment 100 in relation to a generalized run-time environment 200 as shown in FIG. 2. Common objects and data reside in a common database 212, while the environments 100, 200 also accommodate a custom database 214 that includes custom objects, data, and retrieval methods. Because of the extensibility features of the development environment 100, the run-time environment 200 runs on both common 202 and custom 204 hardware. On the common hardware 202 reside both a common run-time environment 206 and a custom one 208. The extensibility features allow all of these elements to work together seamlessly to provide a unified development and operations environment to a user.

Thus, the extensible development environment 100 enhances the value of third-party objects because those objects can now run in multiple environments without modification and without duplicating effort. The unified object model simplifies development, deployment, maintenance, and operations by permitting commands to be issued without modification across heterogeneous systems. Tools work in the same way with common and custom objects. Aspects of the run-time environment 200 are monitored from a single system. Ultimately, the extensible development environment 100 can replace the need for proprietary systems altogether as, for the sake of economically developing new objects for as widespread a market as possible, new objects are developed to follow its extensibility guidelines.

Figure 3:
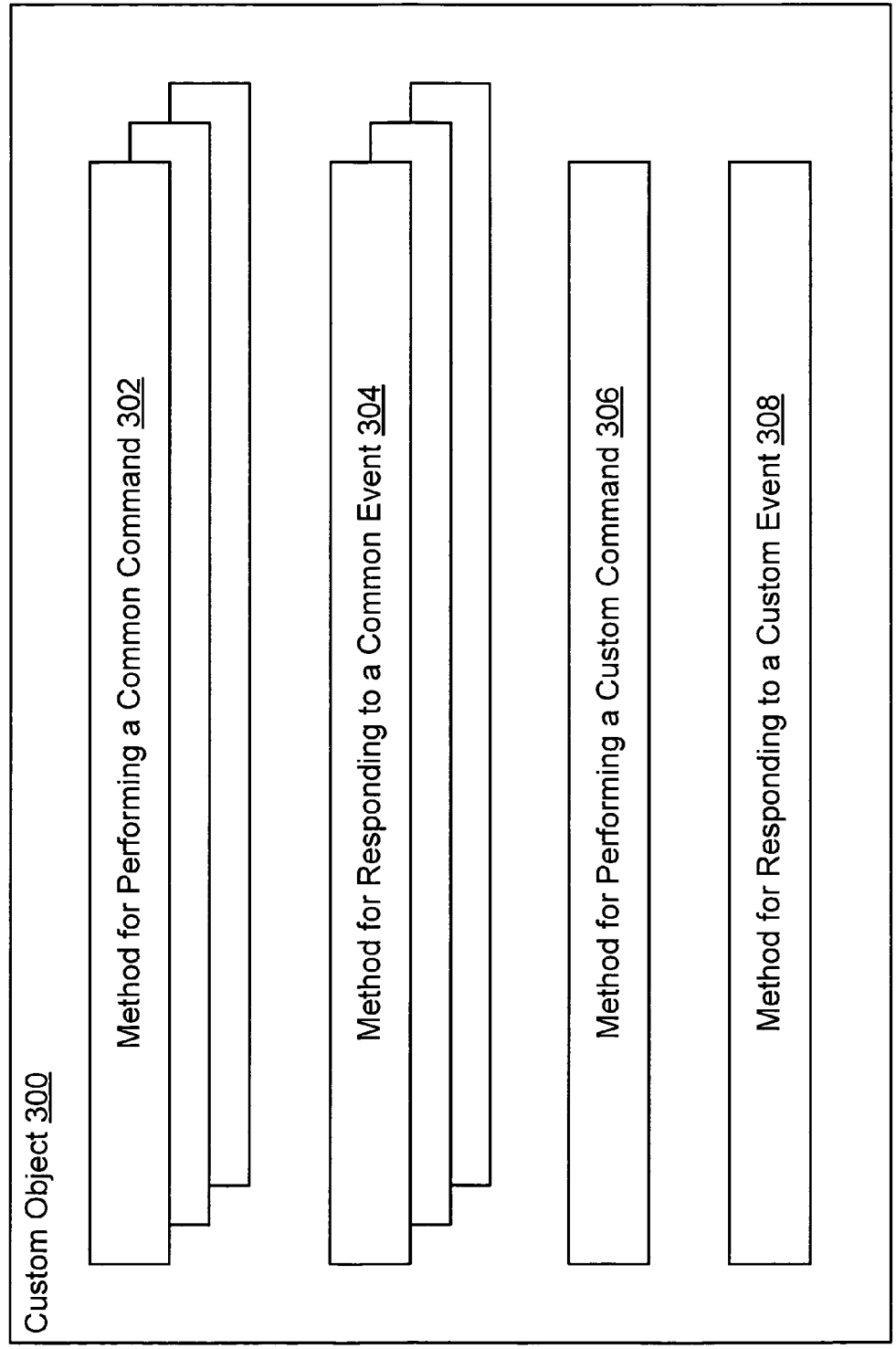
FIG. 3 is data-structure diagram of an object that incorporates a custom command.
Figure 4:
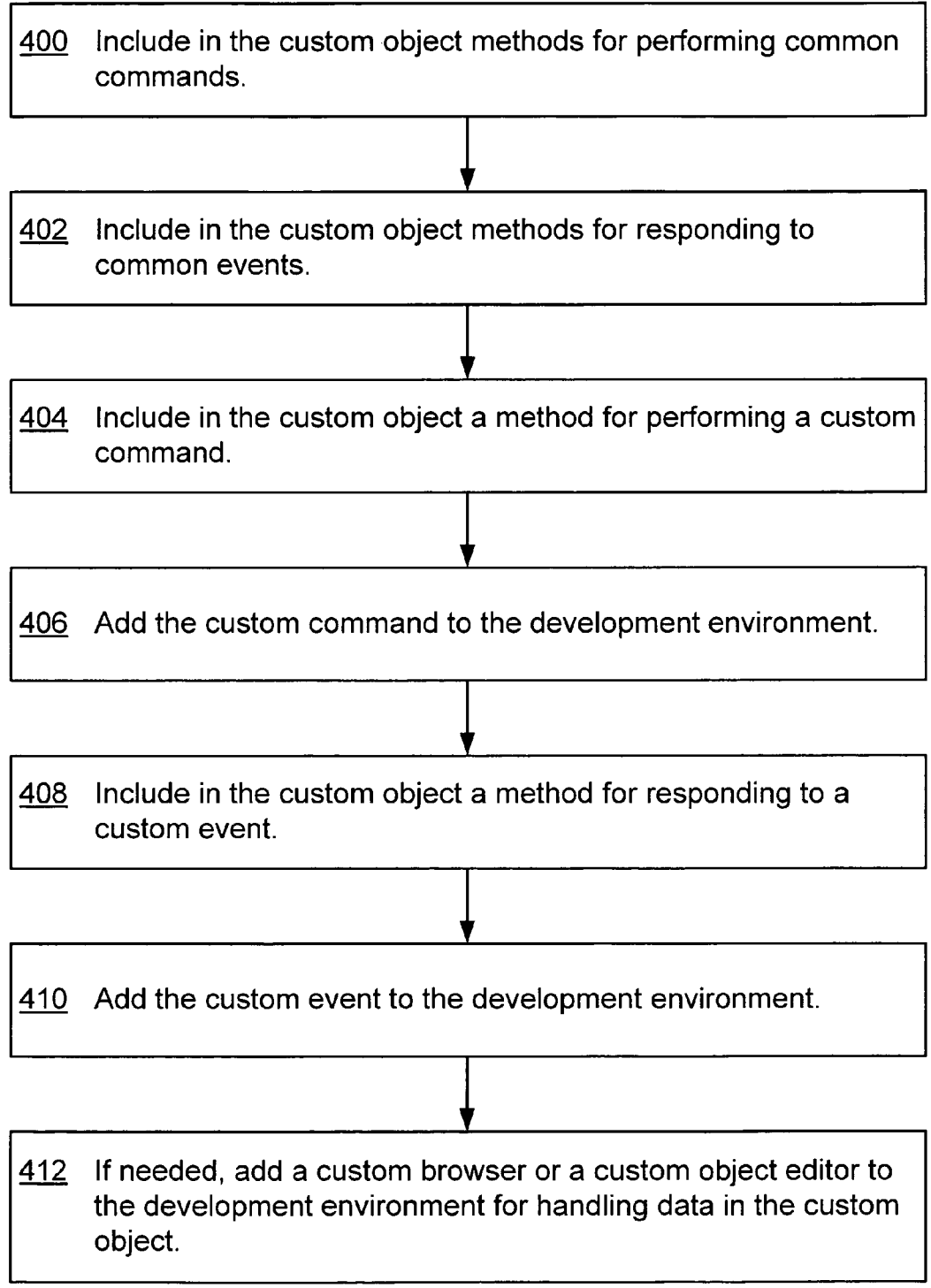
FIG. 4 is a flowchart of a method for integrating a custom automation object into an automation development environment.

To clarify aspects of the present invention, FIG. 3 presents the general structure of a custom object 300. FIG. 4 presents a method for incorporating the custom object 300 into the extensible development environment 100. The custom object 300, just like a common object, includes interfaces and methods for performing common commands 302 and for responding to common events 304. In steps 400 and 402 of FIG. 4, these interfaces and methods are included in the custom object 300.

To any object 300 may be added interfaces and methods for performing custom commands 306 (step 404) and for responding to custom events 308 (step 408). These interfaces follow guidelines provided by the extensible development environment 100. Because the interfaces follow known guidelines, the custom commands and events themselves are incorporated into the extensible development environment 100 (steps 406 and 410) in the same manner as common commands and events. Once they are incorporated, these custom commands and events are processed in the same manner as commands and events native to the extensible development environment 100.

However, this is not to say that the extensible development environment 100 "understands" the significance of the custom commands and events. Instead, it is the duty of the third-party developer of the custom object 300 to provide meaning to these custom commands and events by writing handlers for them and by incorporating the handlers into the custom object 300.

In addition to custom commands and events, the custom object 300 may include custom data structures that are not directly supported by tools provided by the extensible development environment 100. To accommodate this situation, the tools of the extensible development environment 100 are themselves extensible and themselves provide interfaces for use by third-party developers. In step 412 of FIG. 4, the third-party developer provides a custom object editor 122 (see FIG. 1) for manipulating data structures in the custom object 300. In some embodiments, the custom object editor 122 runs "inside" the object editor 120 provided for common data structures by the extensible development environment 100. Thus, a user perceives one unified object editor. When the user calls for a custom data structure to be edited, the common object editor 120 invokes the appropriate custom object editor 122 for the task.

Figure 5:
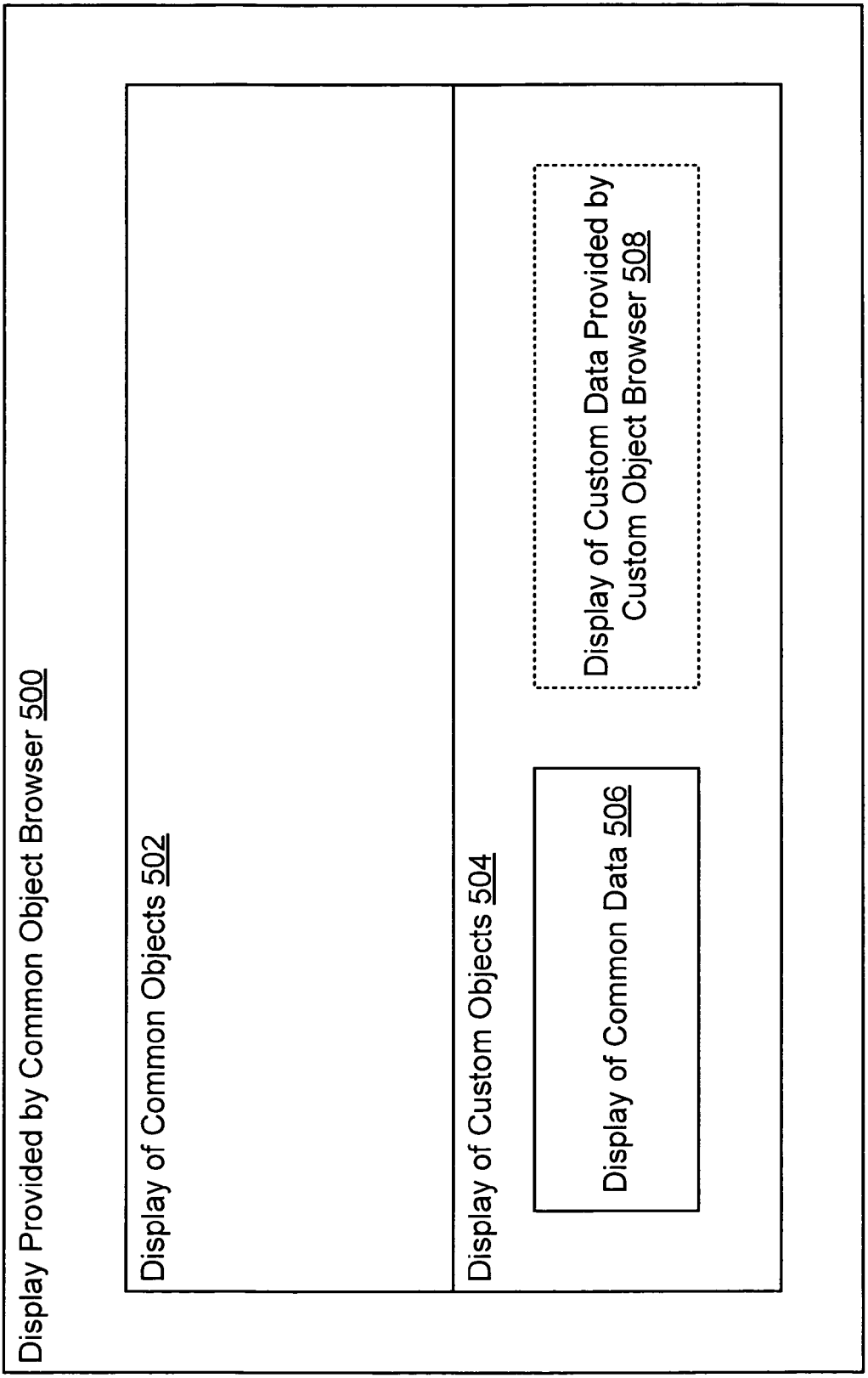
FIG. 5 is a schematic of a common browser working with a custom browser.
Figure 6:
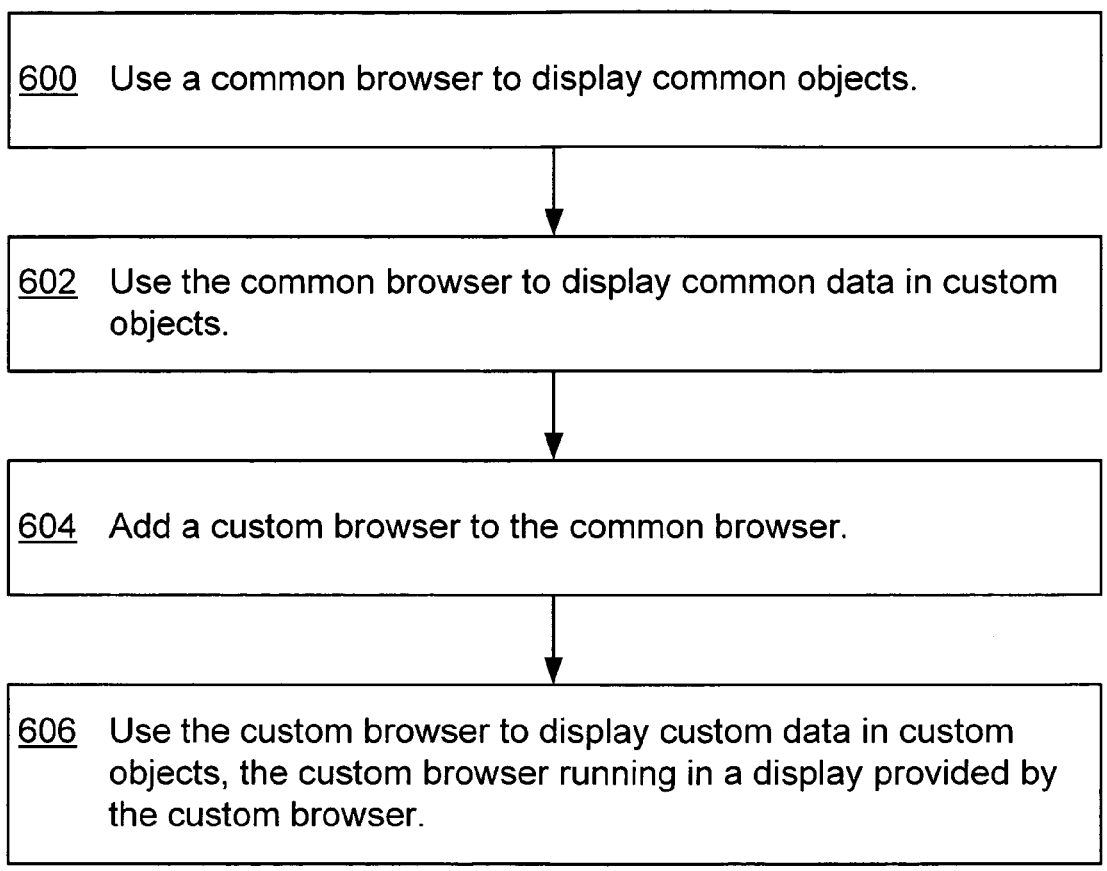
FIG. 6 is a flowchart of a method for a common browser to work with a custom browser.

In a similar way, other tools, such as the common browser 118 of FIG. 1, are also made extensible. FIG. 5 shows a structural layout of a display 500 provided by the common browser 118, and FIG. 6 presents a method for incorporating custom browsing capabilities into the common browser 118. The common browser 118 displays common objects 502 (step 600 of FIG. 6) and displays common data structures 506 of custom objects 504 (step 602). Because the common browser 118 does not understand custom data structures, it relies upon a custom browser extension 508 provided by the third party developer that provides the custom data structure (steps 604 and 606). In this manner, the common browser 118 becomes capable of displaying all objects incorporated into the extensible development environment 100.

Note that FIG. 5 is only illustrative. It is preferred that common objects and custom objects not be differentiated by their display in the browser 118. Instead, the browser 118, by incorporating custom browsing extensions, presents all objects in a seamless, unified manner.

The browser 118 provides a toolbar that is shared by all of its extensions. Extensions can add their own buttons to the common toolbar or can reuse any common toolbar button. Similarly, the browser 118 provides a common status bar. Extensions can add their own panels to the status bar and can reuse an existing panel to show status messages. The browser 118 allows for the addition of custom tabs and filtering.

The following are exemplary interfaces that can be used to embody the present invention. They are illustrative only and are not meant to delimit the scope of the claimed invention in any way.

IExternalBrowser

```
interface IExternalBrowser
{
    // This method is used by the client to initialize the browser with an
    // IPackageManager interface pointer. If this method is not called, then
    the
    // attribute browser cannot perform any functions.
    void Initialize
```

-continued

```
    (
        // Pointer to an object that implements IPackageManager
        object pPackageManager
    );
    // This method is used by the client to uninitialize the browser.
    void UnInitialize( );
    // This method is used to show the browser's user interface. Upon
    closing, the
    // attribute selected is returned through the strUIData out parameter.
    // Returns true if the user selected OK, otherwise returns false.
    bool ShowBrowserUI
    (
        // This parameter denotes any "starting" value that should be passed
        into
        // the browser object to be used while generating the browser's UI.
        string strUIData,
        // This out parameter contains the value(s) selected in the UI by the
        user. If
        // no value is selected, then the value returned is empty.
        out object varSelectedValue
    );
};
```

ICommonAttributeBrowser

```
enum EBrowserReturnValue
{
    // Indicates that a user clicked the OK button.
    eBrowserReturn_Ok,
    // Indicates that a user clicked the Cancel button.
    eBrowserReturn_Cancel,
    // Indicates that a user clicked the Back button.
    eBrowserReturn_Back
}
interface ICommonAttributeBrowser
{
    // This method is used by the client to initialize the browser.
    void InitializeBrowser
    (
        // Connection string
        string bstrConnection
    );
    // This method is used by the client to uninitialize the browser.
    void UnInitializeBrowser( );
    // This method is used to show the browser's user interface. Upon
    closing, the
    // attribute selected is returned through the bstrSelectedValue out
    parameter.
    EBrowserReturnValue ShowBrowser
    (
        // This parameter denotes any "starting" value that should be passed
        into
        // the browser object to be used while generating the browser's UI.
        string strUIData,
        // This out parameter contains the value selected in the UI by the user.
        If
        // no value is selected, then the string returned is empty.
        out string strSelectedValue,
        int nDisplayMode,
        string str
    );
}
```

IaaBrowserControl: Implemented by aaBaseBrowserControl.

```
interface IaaBrowserControl
{
    // ControlGuid is a unique identifier of the control. It is used to identify
    the
    // plug-in and also can be used by the calling program to determine the
```

```
type of the
// returned value and to cast it to the appropriate class. Custom control
specifies
// this value by attaching a custom attribute.
Guid ControlGuid{ get; }
// This is an interface that contains one or more values returned to the
calling
// program. The calling program uses ControlGuid to determine the
types of the
// returned values and to cast them to their appropriate classes. In this
way, the
// calling program may use values returned by different custom controls.
IaaReturnValues IReturnValues { get; }
}
```

IssReturn Values

```
public interface IaaReturnValues
{
    // ControlGuid is a unique identifier of the control.
    Guid ControlGuid{ get; }
    // ReturnValues is a class that contains one or more values returned to
    the calling
    // program. The calling program uses the ControlGuid value to
    determine the
    // types of the return values and to cast them to their appropriate classes.
    In this
    // way, the calling program may use values returned by different custom
    controls.
    object ReturnValues{ get; }
}
```

IaaIDEWindow: Implemented by aaBaseBrowserControl.

```
// This Base interface is implemented by any IDE view.
public interface IaaIDEWindow: IaaIDESnapin
{
    // Called when the snap-in is loaded. The snap-in registers its services
    first and
    // then queries for the services it needs.
    void Initialize(IaaServiceProvider site);
    // Called when the snap-in is unloaded.
    void Uninitialize( );
    // Called when the window is activated.
    void OnActivated( );
    // Called when the window is deactivated.
    void OnDeActivated( )
}
``` aaBaseBrowserControl is a base class for all the custom browser controls. These is not a direct instance of this class. It is not declared as abstract, because designers will create instances of it to show the inherited control.

```
class aaBaseBrowserControl: System.Windows.Forms.UserControl, IaaBrowserControl,
IaaIDEView
{
    // Return values from the custom control.
    protected object m_ReturnValues;
    // This reference is set in IaaIDEView.Initialize. Call the base class function if it is
    // overridden in the inherited class.
    protected IaaServiceProvider m_site;
    public aaBaseBrowserControl( );
    protected override void Dispose( bool disposing );
    // These provide background color for user control.
    protected Color BackgroundColor1{ get; set }
    protected Color BackgroundColor2{ get; set; }
    // Typically, controls override this function to set colors for all the controls they
    // use. The function is called on a WM_THEMECHANGED event.
    protected virtual void OnUpdateThemeColors( );
    // This overload is needed to tell the Theme Color Provider that the theme has
    // changed.
    protected override void WndProc(ref Message m);
    protected override void OnSystemColorsChanged(EventArgs e);
    // Overridden to paint background gradient!
    protected override void OnPaintBackground(PaintEventArgs pevent);
    public virtual Guid ControlGuid{ get; }
    public virtual IaaReturnValues IReturnValues{ get; }
    // Called when the snap-in is loaded. Typically, a custom control overrides this
    // function to provide custom initialization. Base class function is called before
    // any custom action.
    public virtual void Initialize(IaaServiceProvider site);
    // Called when the snap-in is unloaded. Typically, a custom control overrides this
    // function. Base class function is called before any custom action.
    public virtual void Uninitialized( );
    // Called when the window is activated. Typically, a custom control overrides this
    // function to provide support for lazy loading. Base class function is called before
    // any custom action.
    public virtual void OnActivated( );
    // Called when the window is deactivated. Typically, a custom control overrides
    // this function to provide support for lazy loading. Base class function is called
    // before any custom action.
    public virtual void OnDeActivated( )
}
```

IaaBrowserContainer

```
// IaaBrowserContainer is impelemnted by the container.
public interface IaaBrowserContainer
{
    // This class contains all of the initial parameters for the custom control. The
    // control casts this parameter to its specific type and initializes itself. It is a
    // control's responsibility to make sure the cast is valid.
    object InitialParameters{ get; }
    // This class contains all the filter values used by the custom control. The control
    // casts this parameter to its specific type and filters the data accordingly. It is a
    // control's responsibility to make sure the cast is valid.
    object CustomFilter{ get; }
    // This event is raised when the container is closed.
    event OnClosedEventHandler ContainerClosed;
    // This event is raised when the form is closing.
    event OnClosingEventHandler ContainerClosing;
    // This event is raised before a container is displayed for the first time.
    event OnLoadEventHandler ContainerLoad;
    // This event is raised when the container is resized.
    event OnResizeEventHandler ContainerResize;
    // This event is raised when the container is finished validating.
    event OnValidatedEventHandler ContainerValidated;
    // This event is raised when the container is validating.
    event OnValidatingEventHandler ContainerValidating;
    // This event is raised when the OK button on the container is clicked.
    event OnAcceptEventHandler ContainerAccept;
    // This event is raised when browsing has been cancelled.
    event OnCancelEventHandler ContainerCancel;
    // Enable/disable processing of Accept.
    bool AcceptEnabled{ get; set; }
    // Browser control can use this property to set the return type.
    DialogResult ContainerDialogResult{ set; }
}
```

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details are determined by specific situations. Therefore, the invention as described herein contemplates all such embodiments as may come within the scope of the following claims and equivalents thereof.

We claim:

1. An extensible automation development system including a processor and configured with a physical computer-readable medium including computer-executable instructions for allowing a custom automation object to be integrated into the system, the computer-readable medium of the system comprising computer-executable instructions for providing:
   a common browser configured for displaying, in a development environment, data from the automation development system;
   a common object editor configured for editing, in the development environment, data in the automation development system;
   a set of common commands to be performed, in the development environment, by objects in the automation development system;
   for each of at least a subset of the common commands, an interface for performing the command;
   a set of common events to be responded to, in the development environment, by objects in the automation development system;
   for each of at least a subset of the common events, an interface for responding to the event;
   an interface for adding a custom command to the automation development system, the custom command to be performed, in the development environment, by a custom automation object; and
   an interface for adding a custom event to the automation development system, the custom event to be responded to, in the development environment, by a custom automation object.

2. The extensible automation development system of claim 1 wherein the common browser comprises:
   an interface for adding a custom browser, the custom browser configured for displaying data from a custom automation object.

3. The extensible automation development system of claim 1 wherein:
   the common browser is configured for presenting custom tabs and for performing a custom filtering operation.

4. The extensible automation development system of claim 1 further comprising:
   an interface for adding a custom object editor, the custom object editor configured for editing data in a custom automation object.

5. The extensible automation development system of claim 1 further comprising: a common view selected from the set consisting of: a model view, a deployment view, and a derivation view; and
   an interface for adding a custom view to the automation development system.

6. The extensible automation development system of claim 1 further comprising:
   a common database, the common database comprising common automation object templates and instances of at least a subset of the common automation object templates; and
   a custom database, the custom database comprising a custom automation object.

7. The extensible automation development system of claim 1 further comprising:
   a custom automation object;
   wherein the custom automation object is developed by a party other than a party that develops the interface for performing a common command and the interface for responding to a common event.

8. The extensible automation development system of claim 7 wherein:
   the custom automation object comprises a handler selected from the group consisting of: a custom handler for performing at least one of the common commands and a custom handler for responding to at least one of the common events.

9. A method for browsing data in an extensible automation development system configured with a computer-readable medium having a memory and a processor and including computer-executable instructions for allowing a custom automation object to be integrated into the system, the method comprising:
   using a common browser to display, in a development environment, data from the automation development system, the common browser comprising an interface for adding a custom browser;
   using the interface to add a custom browser in the development environment;
   using the custom browser to display, in the development environment, data from a custom automation object;
   using a common object editor to edit, in the development environment, data in the automation development system;

performing, by objects in the development system, a set of common commands in the development environment; wherein the interface performs at least a subset of commands;

responding, by objects in the automation development system, to a set of common events, wherein the interface responds to at least a subset of the events;

adding a custom command to the automation development system, wherein the interface adds the custom command;

performing, by a custom automation object, the custom command in the development environment;

adding a custom event to the automation development system, wherein the interface adds the custom event; and responding to the custom event in the development environment.

10. The method of browsing data in an extensible automation development system of claim 9 wherein:

the common browser is configured for presenting custom tabs and for performing a custom filtering operation.

11. The method of browsing data in an extensible automation development system of claim 9 wherein:

the custom browser is developed by a party other than a party that develops the common browser.

12. The method of browsing data in an extensible automation development system of claim 9 wherein:

the common browser is configured for displaying data from a common database, the common database comprising common automation object templates and instances of at least a subset of the common automation object templates; and wherein the custom browser is configured for displaying data from a custom database, the custom database comprising the custom automation object.

13. The method of browsing data in an extensible automation development system of claim 9 further comprising:

including in the custom automation object a method for performing in the development environment, a common command in the automation development system, the method conforming to the interface provided by the automation development system for performing the common command; and adding the custom command to the automation development system, the adding conforming to the interface provided by the automation development system for adding a custom command.

14. The method of browsing data in an extensible automation development system of claim 9 further comprising:

adding a custom database to the automation development system, the custom database comprising the custom automation object.

\* \* \* \* \*